Aug. 31, 1937.   R. L. MULLER   2,091,646
CALCULATING MACHINE
Filed May 7, 1934   2 Sheets-Sheet 1

INVENTOR
Robert L. Muller
BY
Rector, Hibben, Davis & Macauley
ATTORNEYS

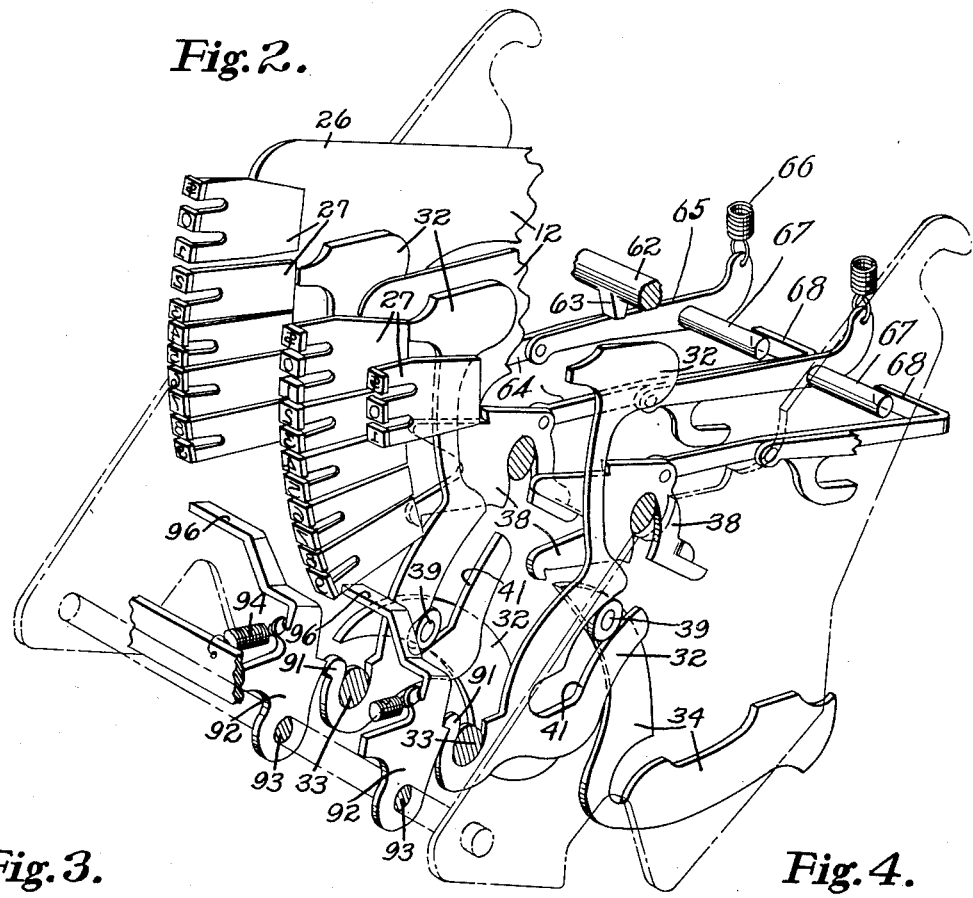

Patented Aug. 31, 1937

2,091,646

UNITED STATES PATENT OFFICE 2,091,646

CALCULATING MACHINE

Robert L. Muller, Detroit, Mich., assignor to Burroughs Adding Machine Company, Detroit, Mich., a corporation of Michigan Application May 7, 1934, Serial No. 724,277

8 Claims. (Cl. 235—60)

This invention relates to calculating machines and is particularly concerned with the printing mechanism thereof whereby a character may be printed in a single column only to the left of the amount printed.

In the Bentzel Patent No. 1,958,464, there is shown a printing mechanism selectively operable to print characters to the left of the printed amount in certain banks in which no digit is indexed and to print a currency sign to the left of the characters. In my prior issued Patent No. 1,997,073 dated April 9, 1935, I have disclosed a machine selectively operable to print special characters or signs such as asterisks in all orders to the left of the highest bank indexed, while permitting zeros to be printed in the same banks when indexed.

In some instances, it is not desirable to print either a cipher or a special character in all unused banks to the left of the highest bank indexed but instead to print a special character such as a dollar or other currency sign in the next adjacent bank only to the highest bank indexed in a printed amount. In other words, it is desirable to be able to print a character sign which is "floating" in nature and will automatically be printed immediately adjacent the highest digit printed regardless of in which bank or order it may appear, and it is to this problem that this invention is directed.

The general object of the invention is to provide an improved calculating machine. A more particular object is to provide a calculating machine capable of checkwriting and of printing a single character only immediately to the left of the amount printed by the machine regardless of the number of digits in the amount printed.

Other and more particular objects will appear from the following specification and drawings illustrating an embodiment of the invention and in which,—

Fig. 2 is a perspective of portions of the printing section of the machine illustrating the controlling latches for the hammers;

Fig. 3 illustrates a sample of work, in the form of a portion of a journal sheet, that can be performed by a machine of this invention; and Fig. 4 illustrates checks that could be printed by a machine of this invention.

General construction

Figure 1:
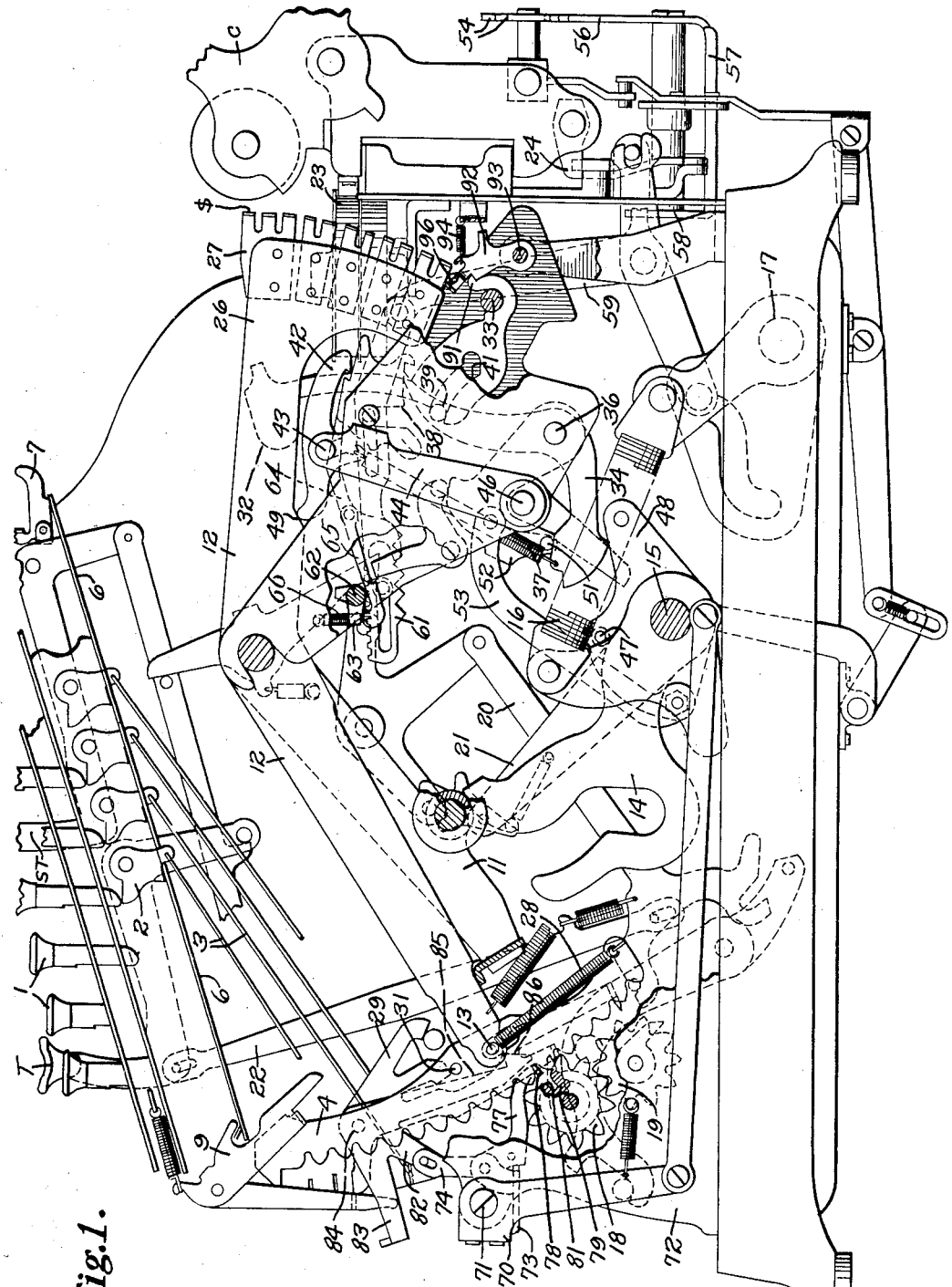
Figure 1 is a right side elevation of a calculating machine embodying the invention.

The machine disclosed is not only capable of use as a calculating and bookkeeping machine, but is also capable of writing checks for the amount entered on the keys of the machine in such a manner as to prevent alteration thereof.

Referring to Fig. 1 the machine is provided with a plurality of banks of depressible amount keys 1, the number of banks being varied to suit the requirements. Items are entered by depressing the keys and, as each key is depressed, its stem rocks a small bell crank lever 2 which pulls a stop wire 3 into position to arrest the downward movement of its actuator rack 4. There are a plurality of these actuator racks of different orders corresponding to the banks of amount keys. When a key 1 is depressed, its bell crank lever 2 moves a key locking slide 6 rearward where it is latched by a detent 7 until released near the end of the machine operation. Rearward movement of the key locking plate for a given bank rocks the latch 9 for that bank counter-clockwise to release the actuator racks for said bank. The actuators do not move downward until further released by movement of the releasing bail 11 which extends across the machine under arms 12 connected to the actuator racks by a pin and slot connection 13 that enables the racks to move a limited amount relatively to the actuators under certain conditions.

During the forward stroke of the machine the bail 11 is rocked counterclockwise from the position of Fig. 1 and during the return stroke it is returned clockwise to the position shown in said figure. This movement of the bail is under the control of the cam 14 fixed to a shaft 15 that has a crank fastened to it which is connected by springs 16 to a crank on the main drive shaft 17.

Registering mechanism is provided in the form of two sets of pinions 18 and 19 forming a "tumbling" register that may be used for addition and for subtraction. The registering mechanism is rocked into and out of engagement with the actuators by a pitman 20 and an arm 21 in a manner that is well known in the art and which need not be described here. Likewise, the control of the "tumbling" registers for addition or subtraction is well known and an understanding of it is not necessary for an understanding of the present invention. Suitable totaling and sub-totaling mechanisms are provided under the control of a total key T and a sub-total key ST, respectively, these keys serving to operate link 22 to control pitman 20.

The machine has a traveling paper carriage C which moves across the machine in one direction under the influence of a spring drum 23 and which is automatically returned by a motor in the manner described in the Rinsche Patent No. 1,580,534. The carriage is provided with a tabulating mechanism 24 by means of which it may be tabulated from column to column so as to occupy different columnar positions which are under the control of the operator or of the paper carriage as it may be desired.

The machine also has an automatic repeat mechanism (not shown) such as is fully described in the Muller Patent 1,397,774 which causes the machine to automatically go through a series of operations after it has been set into operation in a predetermined columnar position of the carriage.

Printing mechanism

The machine is provided with a printing mechanism having a plurality of type carrying members of different orders which are differentially positioned at the same time that the actuator racks or actuators are positioned. The type are carried by the rear extensions of arms 12 which are enlarged to form type carrying members or segments 26.

Each segment carries a plurality of movable types 27 at their outer ends including digit types which range from 0 to 9, inclusive, and in the present invention a special character type.

When bail 11 is moved downwardly during a forward stroke of the machine under the influence of its cam 14, each type segment 26 will be stepped relatively to its actuator because of the slotted connection 13 and under the influence of spring 28, and the type segments, together with the actuators, then continue their movements until arrested in differential positions normally determined for each order by the respective wire 3, that has been moved to position by depression of the amount key 1. Upon return movement of the restoring bail 11, the types and actuators are restored to their normal positions shown in Fig. 1, except that, in the event of a transfer in any order the actuator in said order is given an extra step of movement owing to the fact that the transfer pawl 29 is rocked so that it will not limit the upward movement of the actuator racks to engagement with the stud 31 on said racks.

The hammer operating means for the printing mechanism is of the general type illustrated in Burroughs Patent No. 505,078 with the improvements described in the Putnam Patent 1,018,371 and is in general as follows:

After the type segments are positioned, the printing mechanism is operated to fire the hammers 32 and strike the types 27 that are in printing position. The firing hammers 32 are pivoted at 33, Fig. 2, and each hammer is fired by its respective firing member 34 (Fig. 1) pivoted on the shaft 36 and urged clockwise by a spring 37. Each firing member is normally held against movement by a trigger 38 that hooks over the pointed upper end of the firing member. When the trigger for any bank is released, the firing member 34 for that bank is suddenly snapped clockwise as viewed in Fig. 1 by its spring 37 and through a stud 39 on the firing member operating in a cam groove 41 in the corresponding hammer 32, fires the hammer rearwardly toward the platen.

The triggers 38 are released by their respective pawls 42 (Fig. 1) pivoted on a shaft 43 carried by the upper ends of the two arms 44 that are pivoted on a shaft 46, one of said arms being illustrated in Fig. 1. The lower end of arm 44 illustrated in Fig. 1 extends down into the path of a stud 47 (Fig. 1) on the plate 48 that operates with the shaft 15 and the pitman controlling arm 21.

Near the end of each forward stroke of the machine, the stud 47 engages the lower end of the arm 44 to rock it counterclockwise to thereby carry all the pawls 42 forward to release triggers 38, thereby releasing the firing members 34 for sudden action. This release occurs in all orders in which the type segments 26 move to differential positions greater than their zero positions.

In the orders in which the segments do not move farther than their zero positions, the tails of the pawls 42 engage shoulders 49 (Fig. 1) on the segments 26 as the pawls are moved forwardly and before the triggers would ordinarily be released. The shoulders 49 cam the pawls 42 counterclockwise and move their ends out of the path of the shoulders on the triggers so that the triggers in these orders are not released as the pawls are moved forwardly. This prevents operation of the printing mechanism in all banks in which no amount keys are depressed, and, therefore according to the mechanism thus far described, no figures or ciphers are printed to the left of the last order to the left in which an amount key is depressed. The printing mechanism does however print ciphers to the right, i. e., in all banks to the right of the last bank to the right in which a digit is indexed.

This is accomplished by providing the triggers 38 with tails (not shown) which overlap to the right so that when a trigger in any order is depressed and released it will depress and release all of those to the right of it that are not released by their own power. Accordingly, the hammers in orders to the right where zeros should be printed will be fired along with the hammers in the orders where digits are to be printed, as shown and described in the heretofore mentioned Bentzel patent.

The firing members are restored by a bail 51 (Fig. 1) carried by two side arms 52 pivoted on the shaft 36. One of these arms 52 is connected by a link 53 with the plate 48 that oscillates with the shaft 15. During the forward stroke of the machine the arms 52 are rocked clockwise which moves the bail 51 out of engagement with the tails of the firing member 34 so that they are free to move under the action of the springs 37 when the triggers 38 are released. During the return stroke of the machine the arms 52 are rocked counterclockwise during which movement the bail 51 engages the tails of the firing members 34 and moves them back to normal.

Printing to the left of the last order to the left in which an actuator rack is moved The printing mechanism as so far described is conditioned so that it is disabled in the orders to the left of the last highest order to the left in which a key is depressed or an actuator moved during a machine operation because no keys are depressed in these orders. To print characters to the left of the amount printed, as in a check, for example, it is necessary to have the printing mechanism operate to the left of the last digit that is indexed and this requires a special control of the printing mechanism.

The printing mechanism is automatically conditioned for this purpose by the paper carriage. Some of the mechanisms are disclosed in the Gascon Patent 1,395,991 and in more detail in the Bentzel patent and therefore will be outlined only here. Referring to Fig. 1 the paper carriage is provided with a plurality of rollers 54 of varying sizes, "small, medium, and large", which act on the arm 56 of a pivoted yoke 57 having another arm 58 engaging a member 59. Connected to the upper end of the member 59 is a link in the form of a rack 61 having teeth that mesh with the pinion fixed to a cam shaft 62. Rack 61 is normally urged to the left as viewed in Fig. 1 to normal position. When one of the rollers on the carriage engages the arm 56, yoke 57 is rocked, which in turn rocks the arm 58. This moves the rack 61 to the right (Fig. 1) a distance corresponding to the size of the roller. The rack preferably has four positions as indicated by the four notches in its lower edge with which a locking device cooperates to lock the rack in its various positions, said locking device not being illustrated but being shown in said Gascon patent.

A cam shaft 62 is provided which carries a plurality of cams 63 which in the different positions of the cam shaft, act on the printing mechanism in different orders as is explained in detail in the Bentzel patent. In brief, this mechanism is as follows:

To each of the triggers or latches 38 is pivotally connected a forwardly extending link 64 to which is attached a lever 65 urged upwardly by a spring 66. Levers 65 are adapted to be engaged by cams 63 upon cam shaft 62 and have laterally extending pins 67 (Fig. 2) projecting therefrom in position to engage the bent end 68 of the link 64 of the next higher order or bank of the machine, whenever the associated lever 65 is depressed by engagement with a cam 63.

In other words, whenever a trigger 38 is released its forward movement moves its link 64 and lever 65 forwardly. If lever 65 is in lowered position by engagement with a cam 63, the lever pin 67 will engage the bent end portion 68 of the lever associated with the next higher order trigger and release it to fire its associated hammer.

To cause printing to the left in certain orders or banks, when desired cam shaft 62 is turned to cause the cams 63 to move selected latches to obtain the desired printing in different orders as described in the Bentzel patent and in my prior Patent No. 1,997,073, to which reference is made for further details of this and the foregoing mechanism.

To print characters in place of zeros to the left of the last digit indexed there is mounted at the front of the machine (Fig. 1) a yoke-shaped bail 70 pivoted at 71 on the machine frame plate 72. This bail carries a series of bearing brackets 73 which are fixed to it and which extend toward the machine, there being a bracket in each order of the machine in which a control for special characters is desired.

Pivoted on each of the bearing brackets is a bell crank lever 74 (Fig. 1) urged clockwise by a spring. One arm 77 of the bell crank lever 74 extends substantially horizontally toward the machine and this arm has a bent end or lug 78 that constitutes a feeler for the register pinion 18 of its order. Each of the register pinions is provided with a circular disk 79 having a notch 81 for receiving the lug 78 of arm 77 when the register pinion is in zero position. The other arm of the bell crank lever extends upwardly and is connected by a pin and slot connection to the middle arm 82 on a three-arm lever 83 fastened to a short shaft 84 located between and pivoted in the stationary plates of the machine. The lever 83 has a rearwardly extending arm 85 provided with a shouldered nose 86 adapted to engage under the pin of the pin slot connection 13 of the type carrying member 12.

The parts just described normally occupy the position shown in Fig. 1 where they are inactive. The bell crank lever 74 cannot rock any further clockwise because its edge engages the edge of the bracket 73. The nose 86 of the arm 85 cannot move under the stud 13 because the three-arm lever 83 is held in the position by the bell crank lever 74. The foregoing mechanism will be referred to as a latching mechanism because it is operable to latch the type carrying members 12 against movement.

In the orders in which characters are to be printed, the type carrying members 12 are provided in the usual manner with the digits "0" to "9" inclusive, but the top type instead of carrying the "0" and the "1" type only, carries an additional type "$" for printing a special character which in the illustrated embodiment is a dollar sign.

The type "$" is positioned so that when the type carrying member 12 is in its normal position and while the machine is at rest, the special character or "$" is in position for printing. As previously stated, the connections between the type carrying members and the actuators is such that the type carrying members may move a step relatively to the actuators even though the actuators are not moved. When the machine is operated and the type carrying member moves a step relatively to its actuator the "0" type will be moved up to printing position if the actuator is not moved. If the actuator is moved to index a digit the extra step of movement positions the type carrying member to print the proper digit corresponding to the indexing of the actuators.

Means is provided for moving the latching mechanism to latching position and in the embodiment illustrated this means is actuated and automatically controlled by the paper carriage or by manually depressible keys as described in my prior Patent No. 1,997,073.

*Floating character printing*

As previously stated, it is not always desired to print characters in all banks to the left of the last digit indexed to the left as disclosed in the Bentzel patent, or as disclosed in my prior patent. In some instances, however, it is desired to print a special character, such as a dollar or pound sign, in the bank immediately to the left of the last left indexed bank regardless of which bank this may be as illustrated in Figs. 3 and 4. In other words, for some purposes it is desirable to have in effect what may be termed a "floating character", i. e., a character automatically printed in the bank immediately to the left of the last bank in which a digit is indexed, regardless of which bank is the last to be indexed, and, of course, without interfering with the printing of digits in all of these banks when they are properly indexed by depression of the amount keys.

Having in mind that the printing mechanism is operated in orders to the left of the last order to the left in which an actuator rack is indexed, it will be clear that special characters will be printed in these orders to the left in which a printing mechanism is operated unless means are provided to prevent this printing. Therefore provision is made so that the special character printing occurs only in the one bank immediately to the left of the highest left bank indexed.

For this purpose the hammers of those banks in which it is desired to be able to print characters are latched against movement. Accordingly, each of the hammers 32 cooperating with the character printing type is provided with a hook 91 (Fig. 2) normally engaged by a pivoted latch 92 pivoted on a shaft 93 and normally urged to unlatched position by spring 94. Each latch is provided with a laterally extending tail 96 which extends beneath the lowermost type of the type segment of the next lower order and is retained thereby in latching position with its hammer against the action of spring 94 until the type 27 and segment 26 of the next lower order is raised.

Consequently, if any type sector is retained in its character printing position the printing hammer of the next higher order is locked against printing. On the other hand, when a type sector is raised above the character printing position, to print digits "0" to "9", the hammer of the next higher order will be released. This occurs because raising the type and type segments releases tail 96 of the latch cooperating with the hammer of the next higher order and permits the spring 94 to release the latch whereby the hammer 32 of the next higher order will be released for firing. The type segment associated with the released hammer, i. e., the segment of the next higher order to the segment that is indexed, is not raised and will cause a character to be printed upon firing of the released hammer. It will also be understood that inasmuch as the character segments and types which print a character are not raised, the hammer to the next succeeding higher order and those orders to the left will not be raised. Consequently, only one character will be printed and that will be the character on the segment immediately to the left of the highest order that is indexed regardless of which order is indexed and without interfering with the printing of any of the orders when indexed. After the hammers are fired they are, of course returned by the firing members 34 and the type segments 26 and type 27 are lowered as disclosed in the heretofore mentioned patents. Lowering of the type causes the lowermost type to re-engage tails 96 and restore latches 92 into locking relation with the hooks 91 of the hammers.

It will be understood, of course, that hooks 91 and latches 92 may be provided in any desired order or orders of the machine so that a "floating" character may be printed in any desired order under the control of the highest order actuator that is actually indexed.

It will be apparent from the foregoing that in addition to being capable of printing characters to the left of the highest order printed due to indexing, the character printing being selectively controlled by either carriage control or manual control through the highest order rack indexed; the present invention provides for selective printing of a single character or sign to the left of the highest order in the order or column only immediately to the left of the highest left order indexed regardless of which order is indexed.

It will be apparent to those skilled in the art that minor changes may be made in the details of construction without departing from the spirit and scope of the present invention, as defined in the appended claims.

I claim:

1. A calculating machine having a plurality of banks of depressible amount keys, a plurality of actuators, a printing mechanism including a plurality of type carrying members and type hammers, means for causing firing of said type hammers in orders to the left of the last order to the left in which an actuator is moved during a machine operation, means for latching said type hammers to prevent operation thereof, and means for releasing the latch to the left of the last order to the left in which an actuator is moved during a machine operation while the remaining latches remain latched to cause printing of a character in said single order.

2. A calculating machine having a plurality of banks of depressible amount keys, a plurality of actuators, a printing mechanism including a plurality of type carrying members and type hammers, means for firing said type hammers in orders to the left of the last order to the left in which an actuator is moved during a machine operation, means for latching said type hammers to prevent operation thereof, and means controlled by the last actuator to the left that is moved for releasing the latch to the left of the last order to the left in which an actuator is moved during a machine operation while the remaining latches remain latched to cause printing of a character in said single order.

3. A calculating machine having a plurality of depressible keys, a plurality of actuators, a printing mechanism having plural order type carrying members controlled by said keys and supporting type including a special character type, means automatically conditioned to cause certain of said type to print in those orders to the left of the last order to the left in which an actuator is moved, latching means for preventing said printing to the left when so conditioned, and means for releasing the latching means in the left order immediately adjacent to the last order to the left in which an actuator is moved to print a character therein while the remaining latches are unaffected.

4. A calculating machine having a plurality of depressible amount keys, a traveling paper carriage, a plurality of actuators, a printing mechanism for printing the amounts entered on said keys and the totals thereof having plural order type carrying members controlled by said keys and supporting type including a special character type, means conditioned by said carriage for causing certain of said type to print in those orders to the left of the last order to the left in which an actuator is moved, and means conditioned by and in accordance with the highest order actuator moved during a machine operation for limiting the printing in said orders to the left order immediately adjacent to the last order to the left in which an actuator is moved to print a character therein.

5. A calculating machine having in combination a plurality of depressible keys, a plurality of actuators, plural order type carrying members controlled by said keys and supporting type including a special character type, means for causing certain of said type to print in those orders to the left of the last order to the left in which an actuator is moved during a machine operation, and means conditioned by said actuators for permitting said first means to cause said type to print a character in the order immediately to the left in which an actuator is moved, said first means in the remaining orders to the left being inoperative.

6. A calculating machine having in combination a plurality of depressible keys, a plurality of actuators, a printing mechanism comprising plural order type carrying members controlled by said keys and supporting type including a special character type, means for causing certain of said type to print in those orders to the left of the last order to the left in which an actuator is moved, means for preventing said first means from causing printing in said orders to the left, and means associated with said latter means and conditioned by the last actuator to the left moved during a machine operation for releasing said preventing means to permit said first means to cause printing of a character in the order immediately to the left in which an actuator is moved during a machine operation without printing in the remaining orders to the left.

7. In a calculating machine having a plurality of register pinions, a plurality of actuators associated therewith, and a plural order printing mechanism comprising printing type and hammers operable during cycles of operation of the machine to print the amounts entered in said register pinion and the totals thereof, said printing mechanism being normally conditioned to print to the right and not to the left of the last orders in which a digit is indexed, the combination with means automatically operable to cause said printing type to print characters to the left of the last order to the left in which a digit is indexed, of means operable in accordance with the highest order actuator moved during a machine operation for limiting the printing of characters to the left to a single order immediately adjacent the last order to the left in which a digit is indexed.

8. In a calculating machine having a plurality of banks of depressible amount keys, a traveling carriage, a plurality of actuators, a printing mechanism including a plurality of type carrying members supporting type including a special character type, the combination of means automatically conditioned by said carriage for causing impressions to be made by certain of said type in orders to the left of the last order to the left in which an actuator is moved during a machine operation, with latches for preventing said means for causing impressions by said type to the left of the last moved actuator and means associated with said latches for releasing the latch in the order to the left of the last order to the left in which an actuator is moved while the other latches remain in latched position.

ROBERT L. MULLER.